United States Patent [19]

Yanh

[11] Patent Number: 5,197,557
[45] Date of Patent: Mar. 30, 1993

[54] ELECTRONIC WEIGHING SCALE

[76] Inventor: Li-Hsiang Yanh, No. 22-3, Hao Chin Road, San Shen Village, Pu Yuan Hsiang Changhua, Taiwan

[21] Appl. No.: 804,404

[22] Filed: Dec. 10, 1991

[51] Int. Cl.⁵ ............................ G01G 3/14; G01G 3/08
[52] U.S. Cl. .................................. 177/210 R; 177/229
[58] Field of Search ................... 177/210 R, 211, 229, 177/154

[56] References Cited

U.S. PATENT DOCUMENTS 4,453,608  6/1984  Wirth et al. .................... 177/229 X
4,726,435  2/1988  Kitagawa et al. ............... 177/229 X Primary Examiner—George H. Miller, Jr.
Attorney, Agent, or Firm—Bacon & Thomas

[57] ABSTRACT

An electronic weighing scale, comprising a an induction board supported on a base board by columns, a load board supported on said induction board by columns for bearing any object to be measured, an inductor suspended above said base board, a pressure rod extending from the center of gravity of said and stopped at the suspension end of said inductor, and wherein the weight of the object under measuring causes the suspension end of said inductor to displace downward proportionally and, the range of downward displacement of the suspension end of said inductor is calculated by an electronic circuit and converted into corresponding digital signals for display.

1 Claim, 3 Drawing Sheets

ELECTRONIC WEIGHING SCALE

BACKGROUND OF THE INVENTION

1. Field of the Invention

The present invention relates to electronic weighing scales and relates more particularly to a rigid structure of weighing scale which measures the weight of an object according to the range of displacement of the suspension end of an inductor.

2. Description of the Prior Art

In the known structures of electronic weighing scales, the load board which is provided to bear an object to be measured is supported by springs. During weighing process, the weight of an object causes a push rob to press on an inductor so that the weight of the object is measured by an electronic circuit according the amount of pressure applied at the inductor. Because the majority of the weight of the object is transmitted to the inductor, the size of the inductor shall be large enough to bear the weight of the object measured. Since the size of an inductor is directly proportional to its capacity, the size of an inductor shall be relatively increased when a bigger capacity of weighing scale is required.

SUMMARY OF THE INVENTION

The present invention has been accomplished to eliminate the aforesaid problem. It is therefore an object of the present invention to provide an electronic weighing scale which has a rigid structure to absorb the majority of the weight of an object under measuring with only part of the weight transmitted to an inductor through a pressure rod for measure. It is another object of the present invention to provide an electronic weighing scale in which the inductor bears only a small part of the weight of an object under measuring so that the inductor provides a wide working range.

BRIEF DESCRIPTION OF THE DRAWINGS

The foregoing and other objects, features and advantages of the present invention will be best understood from the following description, the appended claims and the accompanying drawings in which:

DETAILED DESCRIPTION OF THE PREFERRED EMBODIMENT

Figure 1:
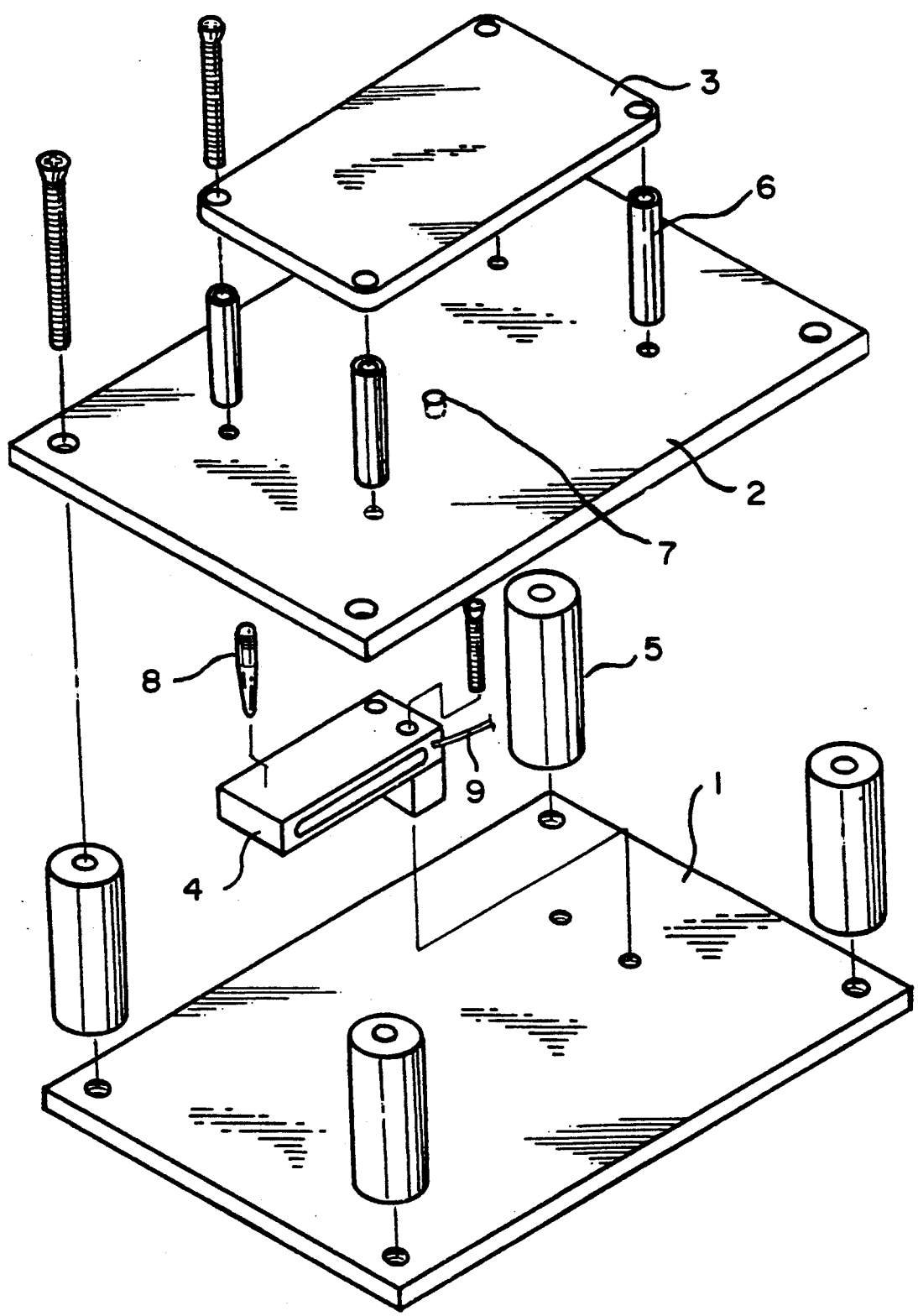
FIG. 1 is an exploded perspective view of an electronic weighing scale embodying the present invention.
Figure 2:
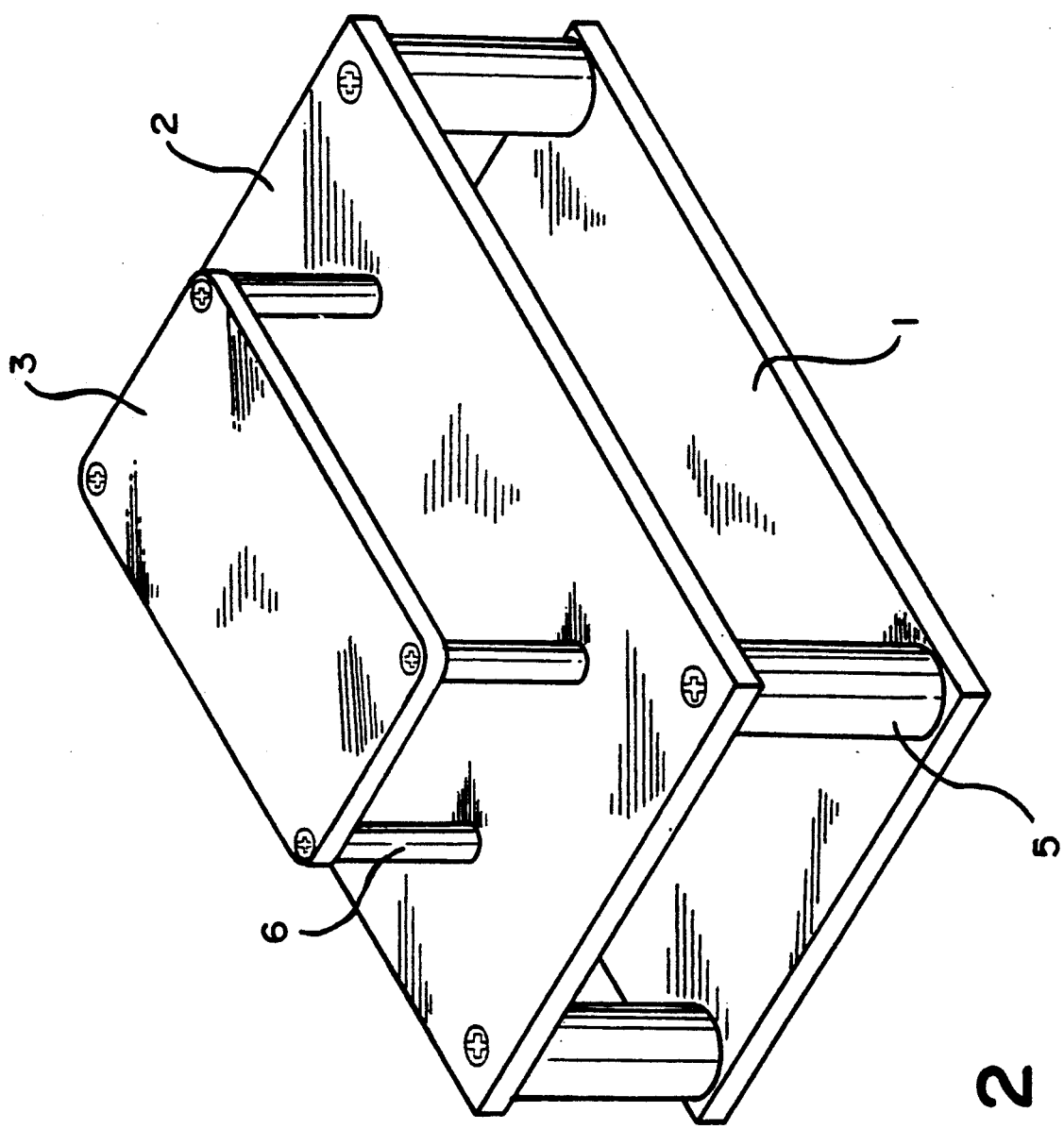
FIG. 2 is an elevational view thereof.

Referring to FIGS. 1 and 2, an electronic weighing scale as constructed in accordance with the present invention is generally comprised of a base board 1, an induction board 2, a load board 3, and an inductor 5. The base board 1 and the induction board 2 are made from rectangular or square plate in suitable thickness. There are four equal columns 5 mounted on the base board 1 at the four corners thereof to support the induction board 2 above the base board 1, and therefore, a suitable distance is maintained between the base board 1 and the induction board 2. The load board 3 is made in shape similar to and in size relatively smaller than the induction board 2, having four corners supported on the induction board 2 by four equal columns 6. The columns 6 are respectively fastened in the induction boards at such symmetrical locations that any load on the load board 3 will be equally transmitted to the columns 5 and, the center of gravity 7 of the induction board 2 will be proportionally moved downwards. The inductor 4 is suspended above the base board 1 at such a location that its suspension end is disposed right below the center of gravity 7 of the induction board 2. The induction board 2 further comprises a vertical pressure rod 8 extending from its center of gravity 7 and stopped at the suspension end of the inductor 4. The inductor 4 has a conductor 9 at an opposite end connected to an IC (not shown). Once the suspension end of the inductor 4 is induced by the pressure rod 8, a corresponding signal is transmitted to the IC for further weighing analysis.

Figure 3:
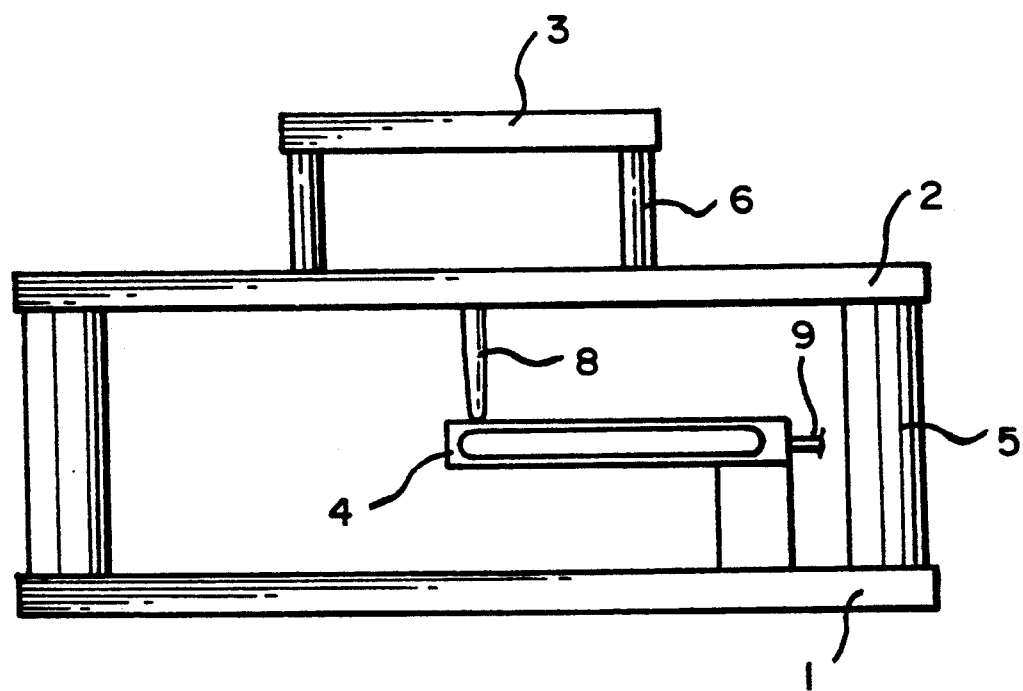
FIG. 3 is a side view thereof.

Referring to FIG. 3, because the induction board 2 is made from a plate of suitable thickness and the four corners thereof are supported on the four columns 5 above the base board 1, the majority of the load which is put on the load board 3 will be immediately transmitted through the columns 6 on the induction board 2 and then absorbed by the columns 5 on the base board 1. At the same time, the center of gravity 7 of the induction board 2 will be caused to displace downward slightly. The downward displacement of the center of gravity 7 of the induction board 2 produces a proportional push force which is applied at the suspension end of the inductor 4 via the pressure rod 8. Therefore, the induced signal is transmitted to the IC through the conductor 9 for converting into corresponding digital signal for display through a liquid crystal display on the front panel (not shown) the electronic weighing scale.

However, for accurate measurement, any load to be measured shall not exceed the yield point of the material for the induction board 2.

As indicated, the load board 3 is symmetrically supported on the rigid structure of the induction board 2. The weight of the load under measuring is almost transmitted to the base board 1 with only a small amount of which directly acted on the induction board 2 causing it to displace downward. The range of movement of the induction board 2 is detected by the inductor 4 and calculated through the IC for further display.

I claim:

1. An electronic scale, the improvement comprising:
    a base board made from a flat, rectangular or square plate in proper thickness, having four equal columns vertically fastened in the four corners thereof at the top;
    an induction board made from a flat plate in size and shape corresponding to said base board and supported on said four equal columns above said base board;
    a load board spaced from and supported on said induction board by four posts at the four corners thereof;
    an inductor suspended above said base board, said inductor having a suspension end disposed right below the center of gravity of said induction board;
    a pressure rod extending from the center of gravity of said induction board, said pressure rod having a free end stopped at the suspension end of said inductor;
    wherein any load which is placed on said load board for weighing causes said pressure rod to move down the suspension end of said inductor and, the downward displacement of the suspension end of said inductor is calculated by an electronic circuit and converted into corresponding digital signals for display.

* * * * *